United States Patent [19]

Legris

[11] 4,007,951
[45] Feb. 15, 1977

[54] MULTI-WAY CONNECTOR FOR HYDRAULIC CONDUITS

[75] Inventor: Andre Legris, St-Maur, France
[73] Assignee: Ste Legris France S.A., France
[22] Filed: Aug. 15, 1974
[21] Appl. No.: 497,674

[30] Foreign Application Priority Data

Aug. 21, 1973 France .................. 73.30326

[52] U.S. Cl. .................. 285/137 R; 285/322; 285/354
[51] Int. Cl.[2] .................. F16L 39/00
[58] Field of Search ............ 285/137 R, 354, 371, 285/321, 322, 323, 39, 119, 242, 370, 133 R, 138; 403/186, 194, 195, 196, 197, 201; 137/271

[56] References Cited

UNITED STATES PATENTS

| 1,851,940 | 3/1932 | Williams | 285/137 R X |
|---|---|---|---|
| 2,701,147 | 2/1955 | Summerville | 285/137 R X |
| 2,800,242 | 7/1957 | Sauthoff | 285/137 R X |
| 3,214,195 | 10/1965 | Zahuranec et al. | 285/137 R X |
| 3,262,721 | 7/1966 | Knight | 285/242 X |
| 3,275,345 | 9/1966 | Waldron et al. | 285/138 X |
| 3,305,249 | 2/1967 | Zahuranec | 285/137 R X |
| 3,469,863 | 9/1969 | Riester et al. | 285/319 X |
| 3,653,689 | 4/1972 | Sapy et al. | 285/322 X |
| 3,701,550 | 10/1972 | Jacobson | 285/39 |
| 3,743,326 | 7/1973 | Courtot et al. | 285/323 X |

FOREIGN PATENTS OR APPLICATIONS 1,158,934 2/1958 France .................. 285/242

Primary Examiner—Thomas F. Callaghan
Attorney, Agent, or Firm—Bucknam and Archer

[57] ABSTRACT

A multipled fluid line connector for hydraulic conduit comprising two cooperating sockets and fixing means for attaching said sockets to one another. Each socket is provided with a grid plate having a plurality of orifices in which are fixed connecting members for receiving the conduits to be connected together, corresponding connecting members of each socket being interconnected. The diameters of the connecting members and associated orifices may be various sizes to accommodate conduits of different diameters.

12 Claims, 8 Drawing Figures

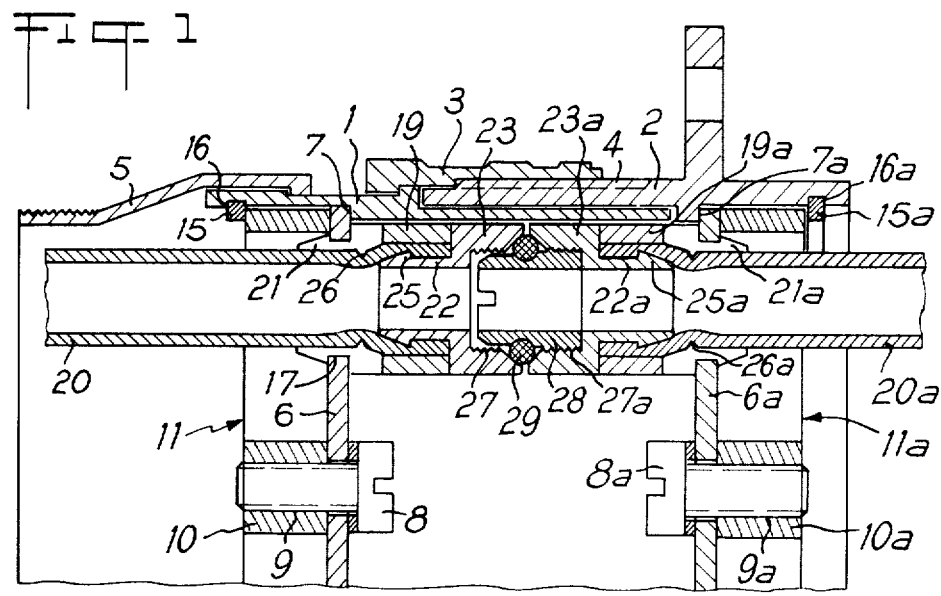
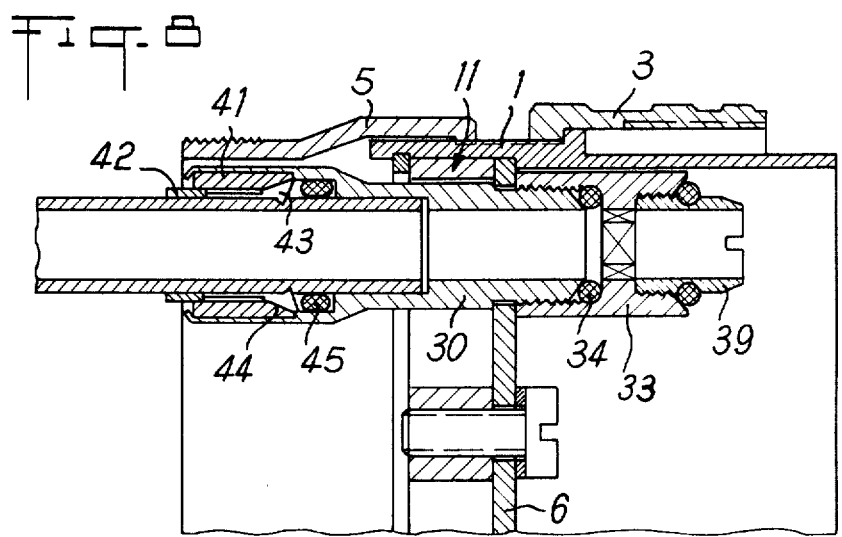

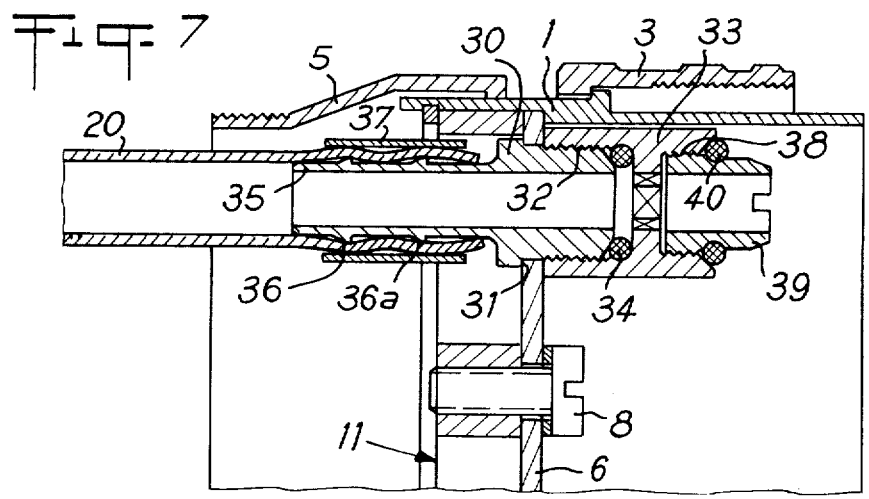
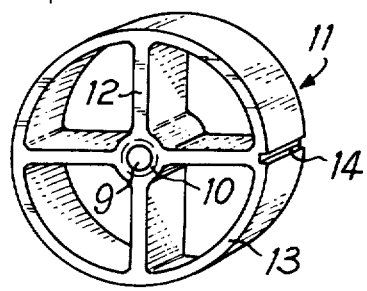
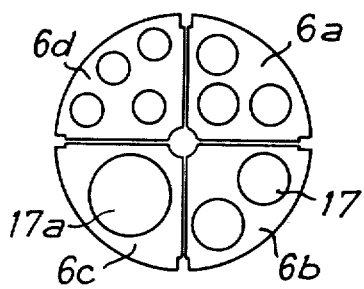
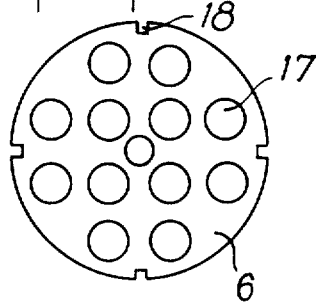
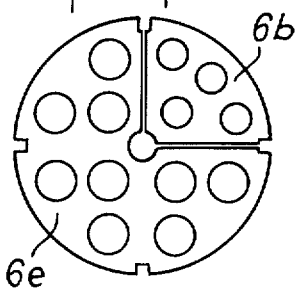
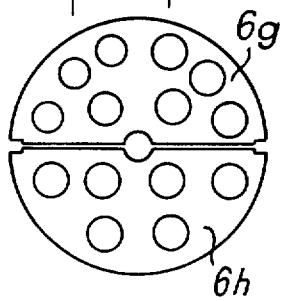

MULTI-WAY CONNECTOR FOR HYDRAULIC CONDUITS

The present invention relates to a multi-way or multiple fluid line connector for hydraulic conduits.

In hydraulic circuits, several conduits are sometimes brought together in the form of clusters which should be capable of being easily and securely connected and disconnected, in a similar way to electrical circuits. Such conduits may be used to effect a connection between a control panel and a machine, where it is occasionally necessary to interrupt this connection, for transport or maintenance purposes.

It is known to use circular connectors enabling tube clusters mounted within a protecting hood to be readily coupled up. These circular connectors, which offer a satisfactory solution, are derived directly from connectors customarily used in the electrical industry. With this arrangement, in the electrical field it is possible to accommodate conductors of different sizes in the main cable, whereas in the hydraulic field it is necessary to provide work-shop facilities specially for making a connection when tubes of different sizes are used, which involves considerable effort and expense.

However, it is customary practice to provide tube clusters containing tubes of different sizes, and an object of the present invention is to provide a multi-way connector enabling tubes of different sizes to be accommodated in the same connector.

According to the present invention there is provided a multi-way connector for hydraulic conduits comprising two co-operating sockets and fixing means for attaching said sockets to one another, each socket being provided with a grid plate having a plurality of orifices in which are fixed connecting members for receiving the conduits to be connected together, corresponding connecting members of each socket being interconnected.

The invention will now be more particularly described by way of example with reference to the accompanying drawings, in which:

FIG. 1 is a sectional view of a multi-way connector;

FIG. 2 is a perspective view of a cross-member mounted in the connector;

FIGS. 3 to 6 are plan views of four different embodiments of grid plate for the connector;

FIG. 7 is a longitudinal section of an embodiment of an element of the connector.

FIG. 8 is a longitudinal section of another embodiment of an element of the connector.

Referring to FIG. 1, a multi-way connector is shown which includes a male socket 1 and a female socket 2, the socket 1 having a threaded sleeve 3 which is screwed on to a corresponding threaded portion 4 of the socket 2. The socket 1 is equipped with a collar 5 (the collar 5 being in two parts) for the purpose of securing the housing accommodating the tube cluster.

Grid plates 6, 6a are mounted in the respective sockets 1 and 2, said grid plates abutting against shoulders 7, 7a in the sockets 1, 2, and being secured by screws 8, 8a engaging in tapped holes 9, 9a in the respective central portions 10, 10a of cross-members 11, 11a.

These cross-members 11, 11a, the first of which is illustrated in FIG. 2, each comprise a central portion 10 connected to the peripheral portion by webs 12, the crossmember being equipped with a groove 14 into which engages a projection (not shown in the drawing) and provided on the inside of each socket 1, 2 for the purpose of correctly locating the said cross-member. The cross-members 11, 11a are secured in position by resilient rings 15, 15a located in grooves 16, 16a provided in the respective sockets 1, 2.

The grid plate 6, which is preferably punched out of sheet metal, may be circular in shape as shown in FIG. 3 and is provided with apertures 17 of uniform or different sizes depending on the diameter of the tubes which are to be connected. The grid plate 6 is provided peripherally with notches 18 into which engage corresponding projections provided in the respective sockets 1, 2 in order to ensure correct location of said grid plate.

FIG. 4 shows a circular grid plate 6 made up of separate quadrant 6a, 6b, 6c, 6d and including different-sized orifices 17, 17a.

FIG. 5 shows a circular grid plate made up of a 270° segment 6e and a quadrant 6b.

Finally, FIG. 6 shows a grid plate made up of two semicircular segments 6g and 6h.

These different arrangements enable the user to assemble with ease elements of grid plate which includes the various orifice sizes required.

Referring again to FIG. 1, standard connecting members 19, 19a, which are located on corresponding ends of tubes 20, 20a be connected up, are mounted in the orifices 17.

The connecting members 19, 19a include respective teeth 21, 21a separated by slots, said teeth engaging by ratchet action in the orifice 17, and being constrained elastically against one of the faces of the grid plate 6. The ends of the respective tubes 20, 20a are gripped between the connecting members 19, 19a and head ends 22, 22a of ferrules 23, 23a; circular ridges 25, 26 and 25a, 26a are provided on the respective head ends 22, 22a and on the ferrules 23, 23a in order to ensure that the tubes, the cross-members and the ferrules fit together.

The ferrules 23, 23a form together a tapped hole 27, one portion 27a of which accommodates a male member 28 which is adapted to insert into the hole 27 forming the female portion of the assembly. The assembly is made leakproof by a toroidal seal 29 mounted on the male member 28.

The tubes 20 are mounted in the socket 1 in the following manner.

The tubes 20 are first inserted loosely into the orifices 17 of the grid plate 6 whereupon the connecting members 19 are snapped into position in the orifices around said tubes so that the latter are held by the ridges 26 of the connecting members 19. After adjusting the connecting members 19 along the tubes 20 so that their ends are flush with the tube ends, the ends 22 of the ferrules 23 are forced into the tubes 20.

The grid plate 6 on which the tubes 20 are mounted and the cross-member 11 are fixed to the interior of the socket 1 by means of the screw 8 and the elastic ring 15. The tubes being thus assembled in the connector, the sheath or housing of the tube cluster is mounted on the collar 5. To complete the operation, the male members 28 with their joint seals 29 are mounted in the tapped holes 27a.

FIG. 7 shows a variant in the mode of assembling the ferrules on the grid plate 6 in which one end of the connecting members 30 bears against one of the faces of the grid plate 6 through a shoulder piece 31, whilst the other end is threaded as at 32, a ferrule 33 being screwed on to said threaded end with the interposition of a toroidal seal 34, said ferrule 33 being thus caused to bear against the other face of the grid plate 6. The other end of the connecting member 30 is extended in the form of a tube 35 provided with ridges 36, 36a, which come into engagement with the end of a tube 20 which is passed thereover and is held in position by an external sleeve 37.

As in the case of the previous embodiment, the ferrule 33 includes a tapped hole 38 in which a male member 39 provided with a toroidal seal 40 is mounted, said male member being adapted to be inserted so as to engage in a hole 38 in the opposite ferrule. The assembly of the connector and of the tubes may be carried out in two ways as follows:

a. The assembly of the connector is completed as shown in FIG. 7 and the tubes are pushed over the tubular extensions 35 and fixed by means of the sleeves 37.

b. If the tube cluster is too compact, it is loosened so as to enable the tubes to be bent and separated.

The connecting members 30 are thereupon assembled separately on the tubes 20, starting from the centre of the cluster. When all the tubes have been provided with connecting members, the latter are fixed on the grid plate 6 which is mounted together with the cross-member 11 in the socket 1. The rest of the assembly procedure is carried out as previously described.

FIG. 8 shows a socket 1 in which the assembly of the connecting members 30 and of the ferrules 33 is identical with that described with reference to FIG. 7. The only difference resides in the mode of fixing the tubes 20 on the connecting member 30 which is provided with "quick-fix" pipe unions of the type described in French specification No. 69 17 467.

This pipe union comprises a sleeve 41 in which is mounted a flexible clip 42 having several jaws 43 adapted to engage against the wall of the tube, the internal diameter of said sleeve having a divergent zone 44 for the purpose of squeezing together the jaws 43 of the clip. A toroidal seal 45 prevents leakage in the tube.

The tubes may be assembled simply by fastening them in the "quick-fix" pipe unions of the connecting members or by proceeding in accordance with the method described above in relation to the device shown in FIG. 7.

It will be understood that various modifications may be made in the devices or methods, which have been described solely by way of example, without departing from the scope of the invention.

I claim:

1. A multiple fluid line connector which comprises a pair of sockets disposed for releasable interconnection, a pair of frames each connected to a corresponding one of said sockets for support thereby, a pair of matching grid plates each releasably connected to a corresponding frame for support thereby, said grid plates having apertures receiving respective fluid line matching connector parts to support same with corresponding pairs of matching connector parts, one on each grid plate, positioned in alignment for interconnection, each of said connector parts being disposed for connection to a corresponding fluid line, each pair of matching connector parts, when interconnected, establishing a fluid flow connection between their associated fluid lines.

2. A multiple fluid line connector according to claim 1 wherein said grid plates are circular in shape and said frames are circular in periphery and have internal bracing cross-members.

3. A multiple fluid line connector according to claim 2, wherein each grid plate is made up of separate elements comprising segments of a circle.

4. A multiple fluid line connector according to claim 1 wherein the grid plates include orifices and corresponding connecting members of different diameters for receiving fluid line conduits of different diameters.

5. A multiple fluid line connector according to claim 1 wherein each grid plate includes notches adapted to engage with corresponding projections on the associated socket.

6. A multiple fluid line connector according to claim 2 wherein a central portion of each cross-member includes a tapped hole for receiving a fixing screw for the associated grip plate, said cross-member being held on the associated socket by means on an elastic ring located in a groove in the socket.

7. A multiple fluid line connector according to claim 6 wherein each cross-member includes a keyway adapted to engage with a projection on the associated socket.

8. A multiple fluid line connector according to claim 1 wherein each of the connector parts includes teeth separated by slots, said teeth being constrained elastically against one face of the grid plate.

9. A multiple fluid line connector according to claim 1 wherein one side of each connector part includes a shoulder piece bearing against one of the faces of the grid plate and the other side has a threaded portion which is screwed into a ferrule with the interposition of a toroidal joint.

10. A multiple fluid line connector according to claim 9 wherein ridges are provided on the connector part and on the end of the ferrule to grip a conduit received therein.

11. A multiple fluid line connector according to claim 9 wherein the ferrule includes a tapped hole into which is screwed a male member on which is mounted an elastic joint, said male member being adapted to engage in a corresponding female portion of a ferrule mounted on the opposite socket.

12. A multiple fluid line connector according to claim 9 wherein the connecting member includes a tubular extension provided with externally circular ridges for receiving the end of a tube held in position by an external sleeve.

* * * * *